US012585038B2

(12) United States Patent
Ktistis et al.

(10) Patent No.: US 12,585,038 B2
(45) Date of Patent: Mar. 24, 2026

(54) METHOD FOR OPERATING A METAL DETECTOR AND METAL DETECTOR

(71) Applicant: Mettler-Toledo Safeline Ltd., Manchester (GB)

(72) Inventors: Christos Ktistis, Lymm Warrington (GB); Iain Rist, Stockport (GB)

(73) Assignee: Mettler-Toledo Safeline Ltd., Manchester (GB)

( * ) Notice: Subject to any disclaimer, the term of this patent is extended or adjusted under 35 U.S.C. 154(b) by 426 days.

(21) Appl. No.: 18/280,793

(22) PCT Filed: Mar. 9, 2022

(86) PCT No.: PCT/EP2022/056042
§ 371 (c)(1),
(2) Date: Sep. 7, 2023

(87) PCT Pub. No.: WO2022/189510
PCT Pub. Date: Sep. 15, 2022

(65) Prior Publication Data
US 2024/0302557 A1      Sep. 12, 2024

(30) Foreign Application Priority Data

Mar. 11, 2021    (EP) ..................................... 21161950

(51) Int. Cl.
*G01V 3/10*          (2006.01)
*G01V 3/38*          (2006.01)
G01N 27/9013      (2021.01)

(52) U.S. Cl.
CPC ................ *G01V 3/107* (2013.01); *G01V 3/38* (2013.01); *G01N 27/9026* (2013.01)

(58) Field of Classification Search
CPC ... G01V 3/00; G01V 3/08; G01V 3/10; G01V 3/104; G01V 3/105; G01V 3/107;
(Continued)

(56) References Cited

U.S. PATENT DOCUMENTS 7,432,715 B2    10/2008   Stamatescu
8,587,301 B2    11/2013   Derungs
(Continued)

FOREIGN PATENT DOCUMENTS

DE        102017124407 A1      4/2019

*Primary Examiner* — Catherine T. Rastovski
*Assistant Examiner* — Matthew W. Baca
(74) *Attorney, Agent, or Firm* — Standley Law Group LLP; Jeffrey S. Standley; Adam J. Smith

(57)                ABSTRACT

Methods for operating a metal detector that includes a balanced coil system with a transmitter coil connected to a transmitter unit and first and second receiver coils connected to an input of a receiver unit. The transmitter unit includes a transmitter signal path for which a transmitter signal with at least one fixed or selectable operating frequency and a related quadrature signal are provided. The transmitter signal is applied to an input of a transmitter amplifier that forwards the amplified transmitter signal directly or via a transmitter matching unit to the transmitter coil. The receiver unit includes at least one receiver signal path in which the modulated receiver signal received from the balanced coil system is applied directly or via a receiver matching unit to a receiver amplifier, which applies the amplified modulated receiver signal directly or indirectly to a receiver phase sensitive detector, which compares the modulated receiver signal with reference signals, which correspond to the transmitter signal and the quadrature signal, to produce a demodulated complex receiver signal with in-phase receiver signal components and quadrature receiver signal components, which are processed in a signal processing unit which comprises at least one signal processing path, in which signal components of the complex receiver signal that relate to goods or noise are suppressed and in which signal components originating from metal contaminants are further processed. At least one transmitter measurement channel is provided, which receives a mea-
(Continued)

surement signal taken from the transmitter signal path and which includes a measurement amplifier, which amplifies and forwards the measurement signal directly or indirectly to a measurement phase sensitive detector, which compares the measurement signal with the reference signals, which correspond to the transmitter signal and the quadrature signal, to produce a complex measurement signal with in-phase measurement signal components and quadrature measurement components, which complex measurement signal and complex receiver signal are applied to a first correction module in which signal components caused by instabilities of the transmitter unit are removed from the complex receiver signal.

15 Claims, 6 Drawing Sheets

(58) Field of Classification Search
CPC .......... G01V 3/165; G01V 3/38; G01N 27/90;
G01N 27/9013; G01N 27/9026; G01N
27/9046; G01N 27/9053; G01N 27/906;
G01R 33/0029
See application file for complete search history.

(56) References Cited

U.S. PATENT DOCUMENTS

| | | | |
|---|---|---|---|
| 10,184,908 | B2 | 1/2019 | Lyon |
| 10,895,658 | B2 | 1/2021 | Zhao |

METHOD FOR OPERATING A METAL DETECTOR AND METAL DETECTOR

TECHNICAL FIELD

The current invention relates to a method for operating a metal detector that uses one or more operating frequencies and to a metal detector operating according to this method.

BACKGROUND ART

A metal detector as described for example in U.S. Pat. No. 8,587,301B2, is used for detecting metal contamination in a product. When properly adjusted and operated, it will help reducing metal contamination in products. Most modern metal detectors use a search head with a balanced coil system. Detectors of this design can detect all metal contaminant types including ferrous, non-ferrous and stainless steels in a large variety of products such as fresh and frozen products.

A metal detector that operates according to the balanced coil-principle typically comprises three coils, a transmitter coil and two identical receiver coils that are wound onto a non-metallic frame, each typically parallel with the other. Since the receiver coils, which typically enclose the transmitter coil centred in between, are identical, an identical voltage is induced in each of them. To receive an output signal that is zero when the system is in balance, the first receiver coil is connected in series with the second receiver coil having an inversed sense of winding. Hence, the voltages induced in the receiver coils, which are of identical amplitude and inverse polarity, are cancelling out one another if the system is in balance and no contaminant is present in an observed product.

However, as soon as a particle of metal passes through the coil arrangement and is exposed to the magnetic field, Eddy currents are forced to flow in the metal particle. The Eddy currents produce a secondary magnetic field, which disturbs the primary electromagnetic field first near one receiver coil and then near the other receiver coil. While the particle of metal is conveyed through the receiver coils, the voltage induced in each receiver coil is changed typically by nano-volts. This change in balance results in a signal at the output of the detection coils that in a receiver unit can be processed, amplified, and subsequently be used to detect the presence of the metal contaminant in the observed product.

Hence, for optimum signal detection, the metal detector should be free or freed from imbalances and disturbances, which could impair the measurement. All modules and components of the metal detector should fulfil highest standards.

In the receiver unit the input signal received from the balanced coil system is normally split into an in-phase component and a quadrature component. The vector composed of these components has a magnitude and a phase angle, which is characteristic for the products and the contaminants that are conveyed through the coil system. To identify a metal contaminant, "product effects" need to be removed or reduced.

Methods applied for eliminating unwanted signals from the signal spectrum exploit the fact that metal contaminants, products and other disturbances have different influences on the magnetic field so that the detected signals differ in phase and magnitude. Materials with a high conductivity cause signals with a higher negative reactive signal component and a smaller resistive signal component. Materials with a high magnetic permeability cause signals with a smaller resistive signal component and a higher positive reactive signal component. Signals caused by ferrite are primarily reactive, while signals caused by stainless steel are primarily resistive. Products, which are conductive, typically cause signals with a strong resistive component. The phase angle of the signal vectors between the resistive signal component and reactive signal component normally remains constant when a product or contaminant is conveyed through the metal detector. If the phase of the product vector is known, then the corresponding signal vector can be suppressed so that a higher sensitivity results for the detection of signals originating from metal contaminants.

As described in U.S. Pat. No. 8,587,301B2, distinguishing between the phases of the signal components of different origin by means of a phase sensitive detector allows obtaining information about the product and the contaminants. A phase sensitive detector, e.g. a frequency mixer or analogue multiplier circuit, allows demodulation of the modulated receiver signal and provides a baseband signal with amplitude and phase information of signal components relating to products, contaminants and disturbances that have an impact on the metal detection process. If the phase of a signal that originates from a contaminant differs from the phase of a product signal, then the product signal can be suppressed while the signal of the contaminant can be further processed. However, if the phase of the signal of the contaminant is close to the phase of the product signal, then the detection of contaminant fails since the signal of the contaminants is suppressed together with the product signal. To separate the phase angle of a product signal from the phase angle of a contaminant, a suitable operating frequency is determined and applied.

As mentioned, imbalances in metal detectors should be avoided or compensated. US2020333498A1 discloses a method with which for an imbalance signal component extracted from a receiver signal control data are provided to a compensation unit that is used for compensating the imbalance signal. The digital in-phase components of the imbalance signal are applied to a first control unit, which provides an in-phase control component for the imbalance signal and the digital quadrature components of the imbalance signal are applied to a second control unit, which provides a quadrature control component for the imbalance signal. In the compensation unit, a digital compensation signal with the frequency of the imbalance signal is synthesised with phase and magnitude according to the in-phase and quadrature control components provided for the imbalance signal. The synthesised digital compensation signal is then converted into an analogue compensation signal and applied to the balanced coil system or to the receiver signal for compensating the imbalance signal.

US20070296415A1 discloses a device for detecting metal in the ground and is therefore very different from the inventive metal detection apparatus. Changes of the coil currents occur, when the ground is changing or when the distance between the search at and ground is changing. Such changes are corrected by monitoring and optimising the coil current in the transmitter coil. By optimising the coil current in the transmitter coil also a slow drift in the receiver signal is corrected. However, only the coil current in the transmitter coil is corrected, but not directly the receiver signal itself. Such correction may even cause fast disturbances in the receiver signal, which would be desirable in the inventive metal detection apparatus, but which are negligible in metal detection apparatus of US20070296415A1.

DE102017124407A1 discloses a metal detector, in which a reference signal is derived from the transmitter and is tapped at the connection point of the receiving coils and, is fed, optionally via an amplifier and/or low-pass filter, to a multiplier. This signal then can be used in later processing as a reference signal for a decomposition of the measurement signal into real and imaginary parts and must be converted to an intermediate frequency for this purpose. Deriving a reference signal used for decomposing a measurement signal into real and imaginary parts is different from deriving a complex measurement or correction signal used for correcting a receiver signal.

Correction loops implemented for compensating imbalances have a relatively high time constant and low baseband bandwidth in order not to affect signals originating from scanned objects. Consequently, higher frequency instabilities, which may occur in the metal detector, are disregarded by the correction loop, so that the received signal is affected by higher frequency instabilities, which are limiting the achievable signal-to-noise ratio and the discrimination performance and possibly cause false alarms.

The present invention is therefore based on the object of providing an improved method for operating a metal detector that uses one or more operating frequencies and to an improved metal detector operating according to this method.

The inventive method shall allow reliably compensating and/or eliminating imbalances in the metal detector, particularly also imbalances and disturbances having higher frequencies. Imbalances shall be removed from the received signal so that signals relating to contaminants can be detected with higher signal-to-noise ratio. The inventive method shall allow correcting or compensating dynamic imbalances and disturbances and/or essentially static imbalances. Hence, undesirable modulation of the received signal in phase and/or amplitude by low-frequency or higher frequency instabilities shall be corrected or compensated. Furthermore, a drift in phase and/or amplitude of the receiver signal shall be detectable and correctable.

The control loop for controlling low frequency imbalances shall be improved so that higher frequency imbalances do not disturb the compensation of low-frequency imbalances.

SUMMARY OF INVENTION

The method serves for operating a metal detector that comprises a balanced coil system with a transmitter coil that is connected to a transmitter unit and with a first and a second receiver coil that are connected to an input of a receiver unit, which transmitter unit comprises a transmitter signal path for which a transmitter signal with at least one fixed or selectable operating frequency or transmitter frequency and a related quadrature signal are provided by an internal or external frequency source, which transmitter signal is applied to an input of a transmitter amplifier that forwards the amplified transmitter signal directly or via a transmitter matching unit to the transmitter coil; which receiver unit comprises at least one receiver signal path in which the modulated receiver signal received from the balanced coil system is applied directly or via a receiver matching unit to a receiver amplifier, which forwards the amplified modulated receiver signal directly or indirectly to a receiver phase sensitive detector, which receiver phase sensitive detector demodulates the modulated receiver signal with reference signals, which correspond to the transmitter signal and the quadrature signal, to produce a demodulated complex receiver signal with in-phase receiver signal components and quadrature receiver signal components, which in-phase receiver signal components and quadrature receiver signal components are processed in a signal processing unit which comprises at least one signal processing path, in which signal components of the complex receiver signal that relate to goods or noise are suppressed and in which signal components originating from metal contaminants are further processed.

According to the invention at least one transmitter measurement channel is provided, which receives a measurement signal taken from the transmitter signal path and which comprises a measurement amplifier, which amplifies and forwards the measurement signal directly or indirectly to a measurement phase sensitive detector, which measurement phase sensitive detector demodulates the measurement signal with the reference signals, which correspond to the transmitter signal and the quadrature signal, to produce a complex measurement signal with in-phase measurement signal components and quadrature measurement components, which complex measurement signal and complex receiver signal are applied to a first correction module in which signal components caused by instabilities of the transmitter unit are removed from the complex receiver signal.

The transmitter signal path and the receiver signal path may comprise further electronic modules, such as additional amplifiers and filter units for processing the transmitter signal and the modulated or demodulated receiver signal. As well also the signal processing path may comprise further modules such as filter modules.

Further, it is possible to implement functional modules, such as the phase sensitive detectors, in the analogue domain or in the digital domain. Hence, output signals of the receiver amplifier and the measurement amplifier can be applied to the input of the receiver phase sensitive detector and the measurement phase sensitive detector, which are connected at the output via analogue-to-digital converters to the signal processing unit. Alternatively, the receiver phase sensitive detector and the measurement phase sensitive detector may be implemented as software modules in the signal processing unit or signal processing path.

The measurement signal, which corresponds to the transmitter signal at a specific point in the transmitter signal path, is preferably picked-up at the end of the transmitter signal path or at the transmitter coil of the balanced coil system. In one preferred embodiment, the measurement signal is transferable from the output of the transmitter amplifier to the input of the measurement amplifier. In another preferred embodiment, the transmitter matching unit comprises a coupling transformer having at least one primary coil and at least one secondary coil, from which the measurement signal is transferable from the at least one primary coil or at the at least one secondary coil to the input of the measurement amplifier. In a further preferred embodiment, a measurement coil is coupled to the transmitter coil of the balanced coil system, from which measurement coil the measurement signal is transferable to the input of the measurement amplifier. Since the measurement signal is compared in the measurement phase sensitive detector with reference signals, i.e., the transmitter signal and the related quadrature signal provided by the frequency source, any instability or drift in phase or amplitude, which has occurred along the observed transmitter signal path, will be detectable at the output of the measurement phase sensitive detector. Information and signals gained relating to instabilities and drift of the transmitter channel, which have an impact on the modulated receiver signal, can therefore advantageously be applied to a correction module provided in the signal processing path of the signal processing unit to remove at least a part of the impact of transmitter instabilities and transmitter drift.

Transmitter instabilities or disturbances typically occur with higher frequencies compared to imbalances of the balanced coil system, for example imbalances which may be caused by changes of thermal conditions. Due to the cancellation or compensation of higher frequency transmitter instabilities, which are ignored in conventional metal detectors, signals relating to goods and contaminants can be detected with higher signal-to-noise ratio. Further, also false alarms, which were caused by transmitter instabilities, are avoided.

The measurement signal is preferably continuously observed and the related complex measurement signal that represents the impact of continuous instabilities of the transmitter unit on the modulated receiver signal is continuously applied together with the complex receiver signal to a first correction module in which the impact of continuously occurring instabilities of the transmitter unit is removed. Signal components relating to products and contaminants conveyed through the metal detector, are preferably removed at a later stage in a metal detection module.

In a preferred embodiment the complex measurement signal is processed during calibration of the metal detector to obtain a complex or non-complex constant reference value that represents a constant impact of the transmitter unit on the modulated receiver signal. This reference value is a reference that reflects the state of the transmitter unit at the time the metal detector was calibrated and is used for normalising the complex receiver signal or the complex measurement signal. For this purpose, the reference value can be applied to the complex receiver signal or to the complex measurement signal as described below. The normalised measurement signal ms represents then no longer the absolute measurement of the transmitter channel but only the change in the measurement of the transmitter channel in the time interval between calibration has been made and the actual measurement.

In one embodiment the constant reference value and the complex receiver signal are applied to a second correction module in which the complex receiver signal is normalised.

In another embodiment the constant reference value and the complex measurement signal are applied to a normalisation module in which the complex measurement signal is normalised before it is applied to the first correction module.

The inventive metal detector preferably comprises a control loop with which low frequency imbalances caused for example by the balanced coil system are compensated. For this purpose, the control loop comprises a loop control module, which removes signal components relating to products and contaminants from the complex receiver signal to obtain a complex imbalance signal. Based on the determined complex imbalance signal and implemented control functions, such as PID-functions, the loop control module provides a complex compensation signal. As described in US2020333498A1 extracted imbalance signal components or extracted imbalance signal information can also be used for synthesising a compensation signal.

As described below, the compensation signal is preferably modified in one or more modification modules and then modulated with the operating frequency. The modulated digital compensation signal is then converted in a digital-to-analogue converter, which provides a modulated analogue compensation signal to the balanced coil system or to the modulated receiver signal in the receiver unit for compensating the imbalance signal component contained in the modulated receiver signal. Preferably, the compensation signal is applied to a compensation unit, such as a summation or subtraction unit, provided in the receiver signal path arranged preferably before the receiver amplifier. The modulated analogue compensation signal may be amplified in at least one amplifier stage as required.

Most preferably, the compensation signal is modified by the complex measurement signal in such a way that it corresponds exactly to imbalances appearing in the receiver channel, which are modified due to imbalances occurring for example in the balanced coil system or instabilities of the transmitter unit. In this way it is ensured that low frequency imbalances occurring in the receiver channel, which are influenced by transmitter instabilities, are completely compensated or cancelled or subtracted from the receiver signal. Corrections applied to the complex receiver signal, from which the compensation signal is derived, must therefore be undone by modifying the derived compensation signal. Hence, the compensation signal is derived from a combination of the extracted imbalance signal or imbalance signal information and the measurement signal or measurement signal information.

Hence, the correction applied to the complex receiver signal in the first correction module is removed from the complex compensation signal by applying the complex compensation signal and the complex measurement signal to a first modification module. The correction applied to the complex receiver signal in the second correction module is removed from the once modified complex compensation signal by applying the once modified complex compensation signal and the constant reference value to a second modification module. The first and the second modification modules are arranged in any order in series with one another.

If the complex measurement signal has been normalised by the constant reference value and then applied to the first correction module, then these corrections are removed from the compensation signal by the application of the normalised complex measurement signal and the complex compensation signal to a single modification module, in which the normalisation of the complex measurement signal by the constant reference value and the correction of the complex receiver signal by the normalised complex measurement signal are undone.

By removing undesirable impacts of the transmitter unit, the inventive method allows therefore obtaining receiver signals relating to products and contaminants with higher signal-to-noise ratio and removing low-frequency imbalances in the receiver unit with higher precision.

Inventive metal detectors can operate with one or more operating frequencies. If two or more operating frequencies are used, then the receiver signal is preferably processed for each operating frequency individually in a dedicated receiver signal path and in a dedicated signal processing path. For each operating frequency, the measurement signal is processed in a dedicated transmitter measurement channel. The receiver signal and the measurement signal are therefore processed in parallel for each operating frequency.

BRIEF DESCRIPTION OF DRAWINGS

Detailed aspects and examples of the invention are described below with reference to the drawings, wherein.

DESCRIPTION OF EMBODIMENTS

Figure 1:
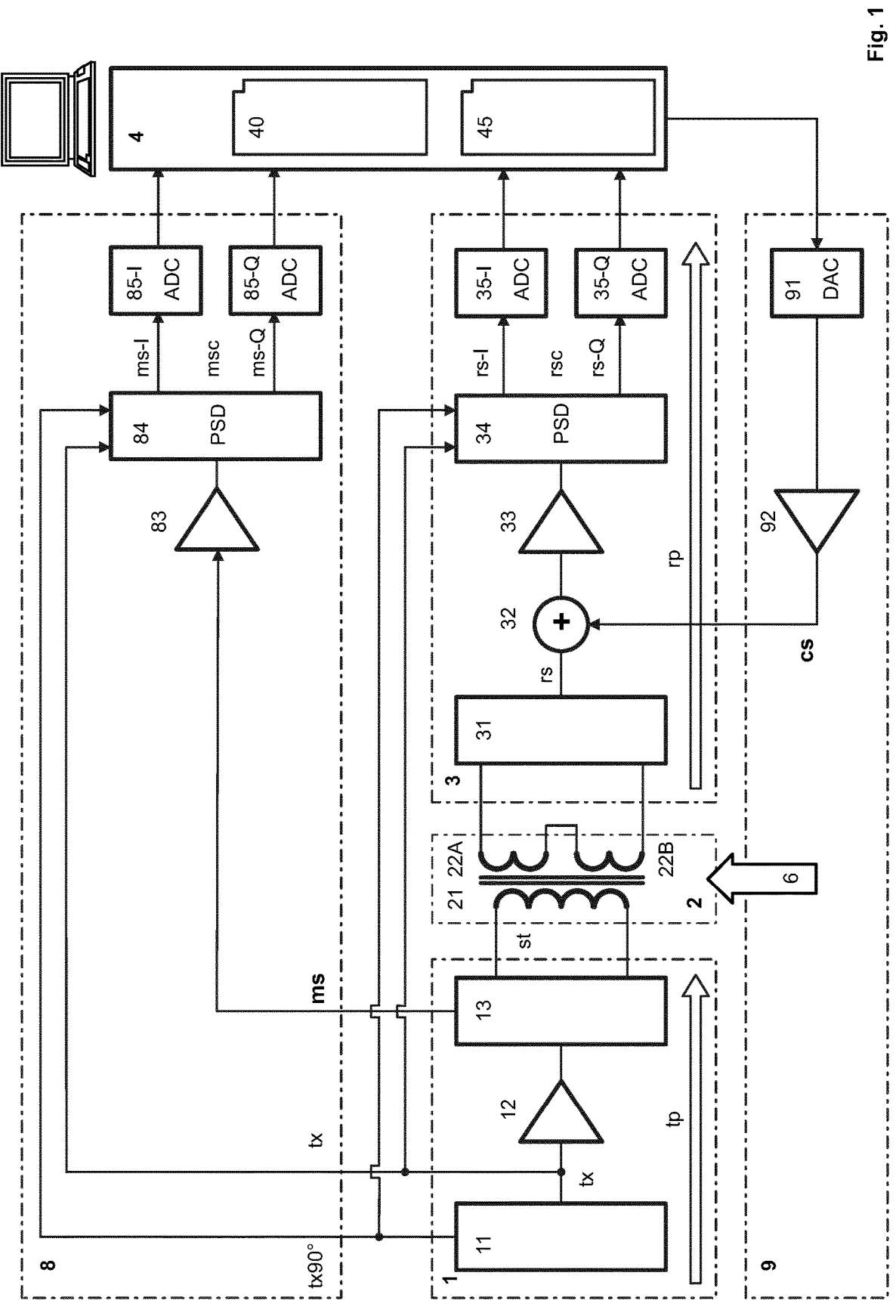
FIG. 1 shows a preferred embodiment of an inventive metal detector comprising a transmitter unit 1, a balanced coil system 2, a receiver unit 3 and a signal processing unit 45 integrated in a control unit 4 with a transmitter measurement channel 8, along which a measurement signal ms, which is taken from the transmitter signal path tp is forwarded to the signal processing unit 45, and with a compensation channel 9, along which a compensation signal cs is transferred to the receiver unit 3.

FIG. 1 shows a block diagram of an inventive metal detector in a preferred embodiment, which comprises a transmitter unit 1, a balanced coil system 2 with a transmitter coil 21 and a first and a second receiver coil 22A, 22B, a receiver unit 3, a control unit 4 that comprises a control program 40 and a digital signal processing unit 45, as well as interfaces, and input and output devices. It is symbolically shown that the metal detector may comprise a conveyor 6, on which products are transferred through the balanced coil system 2.

The transmitter unit 1 comprises a transmitter signal path tp with an internal or external frequency source 11, such as a synthesiser, a transmitter amplifier 12 and preferably a transmitter matching unit 13. That transmitter signal path tp may comprise further modules such as filters. The frequency source 11 provides a transmitter signal tx with at least one fixed or selectable operating frequency. The frequency source 11 further provides a quadrature signal tx90° which is offset in phase by 90° relative to the transmitter signal tx. The transmitter signal tx is applied to the input of a transmitter amplifier 12, which may operate for example in class A or class B mode or may be provided in the embodiment of an H-bridge.

The output of the transmitter amplifier 12 is connected to the input of the transmitter matching unit 13, which preferably comprises a coupling transformer with at least one primary coil and a secondary coil, which allows adapting the transmitter amplifier 12 to the transmitter coil 21. The impedance matching unit 13 preferably also comprises tuning capacitors that are selectively connectable to the transmitter coil to create a resonant circuit that is tuned to the selected operating frequency as further described below with reference to FIG. 4.

In the balanced coil system 2 the receiver signal rs is modulated by disturbances occurring in the magnetic field, when products, possibly products containing contaminants, are transferred through the balanced coil system 2. However, even though the receiver coils 22A, 22B are identical and are set in a balanced state at the factory site, there will still be occasions where the balanced coil system will fail to be in balanced with no products present, possibly resulting in perfectly acceptable food products being rejected. The balance of the metal detector can be disturbed due to mechanical impacts on the system, due to changing ambient conditions, due to metallic objects located in the vicinity of the detector or due to relaxation or aging of components. In view of the high sensitivity of metal detection systems and minute effects of contaminants on the output voltage of the coil system, imbalances may also cause saturation of the receiver channels, particularly of the input amplifiers and the phase sensitive detectors and the ADCs, which only operate over a limited voltage signal range. To remove such imbalances an adjustable compensation signal is combined with the received signal and varied until the undesired imbalance is compensated.

The receiver unit 3 comprises at least one receiver signal path rp preferably with a receiver matching unit 31, which comprises for example a balanced transformer that adapts the balanced coil system impedance to the receiver channel impedance. The modulated receiver signal rs provided by the receiver matching unit 31 and a compensation signal cs are applied to a compensation unit 32, such as a summation or subtraction unit. With the compensation signal cs an imbalance contained in the modulated receiver signal rs is compensated so that a compensated modulated receiver signal is forwarded to the input of a receiver amplifier 33.

The receiver amplifier 33 delivers the amplified and compensated receiver signal rs to a receiver phase sensitive detector 34, in which the modulated receiver signal rs is compared or multiplied with an in-phase reference signal and a quadrature reference signal, namely the transmitter signal tx and the related quadrature signal tx90° provided by the frequency source 11. At the outputs of the receiver phase sensitive detector 34 a demodulated complex receiver signal rsc with an in-phase receiver signal component rs-I and a quadrature receiver signal component rs-Q is provided.

The complex receiver signal rsc is forwarded from the receiver phase sensitive detector 34 via receiver analogue-to-digital converters 35-I; 35-Q to a digital signal processing unit 45, for example a digital signal processor provided in a control unit 4. The control unit 4 further comprises an operating or control program 40, with which all processes of the metal detector during calibration and operation are controlled.

If the metal detector uses more than one operating frequency, then the receiver unit 3 preferably individually comprises a receiver signal path rp for each operating frequency. The receiver signal would therefore be processed in different receiver paths arranged in parallel.

In the signal processing unit 45 a signal processing path sp is implemented, in which the complex receiver signal rsc is processed. Signal components of the complex receiver signal rsc that relate to goods or noise are preferably suppressed and signal components originating from metal contaminants are further processed and detected.

Further, along the signal processing path sp the complex receiver signal rsc is further processed to provide a compensation signal cs with which the above-described imbalances, which are constant or have a very low frequency, are removed from the modulated receiver signal rs. The digital compensation signal provided by the signal processing unit 45 is forwarded to a digital-to-analogue converter 91 which provides an analogue compensation signal that is forwarded to compensation unit 32 in the receiver unit 3.

As described above the correction loop control signal, before it is modulated and applied to the compensation unit 32, has a relatively high time constant and low bandwidth in order not to affect signals originating from scanned objects. Consequently, higher frequency instabilities, which may occur in the metal detector, are disregarded by in the compensation loop, so that the received signal is affected by higher frequency instabilities, which thus limit the achievable signal-to-noise ratio and the discrimination performance and possibly cause false alarms. Further, higher frequency instabilities may cause disturbances in the compensation loop so that even the correction of low-frequency imbalances may get impaired.

Such higher frequency instabilities, which are disregarded by the compensation loop, are typically caused by the transmitter unit 1. Further, due to changes in the transmitter unit 1, the transmitter coil signal st may also drift in phase and/or amplitude, which may affect measurement and detection of contaminants as well.

To eliminate such instabilities or anomalies occurring along the transmitter signal path tp, a transmitter measurement channel 8 is provided, which receives and processes a measurement signal ms taken from the transmitter signal path tp. The measurement signal ms corresponds to the transmitter signal tx picked up at a specific point along the transmitter signal path tp. Preferably the measurement signal ms is picked up close to the output of the transmitter unit 1 so that any undesirable modification of the transmitter signal tx is captured and a related impact on the modulated receiver signal rs can be corrected or compensated. In the embodiment of FIG. 1 the measurement signal ms is picked up at the transmitter matching unit 13 so that any undesirable influence present on the output of the transmitter amplifier 12 can be determined and corrected or compensated.

The transmitter measurement channel 8 comprises a measurement amplifier 83, which receives, amplifies and forwards the measurement signal ms to a measurement phase sensitive detector 84. The measurement phase sensitive detector 84 demodulates the measurement signal ms with an in-phase reference signal and a quadrature reference signal, namely the transmitter signal tx and the related quadrature signal tx90° provided by the frequency source 11, to produce a demodulated complex measurement signal msc with in-phase measurement signal components ms-I and quadrature measurement components ms-Q, which are forwarded via analogue-to-digital converters 85-I; 85-Q to the signal processing unit 45.

In the signal processing unit 45 the complex measurement signal msc and preferably also a reference value msc-r derived from the complex measurement signal msc are applied to at least one correction module 451, 452, 4510, provided in the signal processing path sp, as described below with reference to FIGS. 3a and 3b. Thereby, instabilities and disturbances caused by the transmitter unit 1 can be removed.

Preferably such compensations or corrections are undone in modification modules 4561, 4562 by the application of the complex measurement signal msc or components thereof to create a modified complex compensation signal isc1, isc2 that exactly correspond to the imbalance signal components contained in the modulated receiver signal rs processed in the receiver signal path rp, which are also influenced by disturbances and instabilities of the transmitter unit 1. Consequently, with the compensation signal cs derived from the modified complex compensation signal isc1, isc2 the corresponding imbalance signal components in the modulated receiver signal rs can be cancelled completely.

Figure 2A:
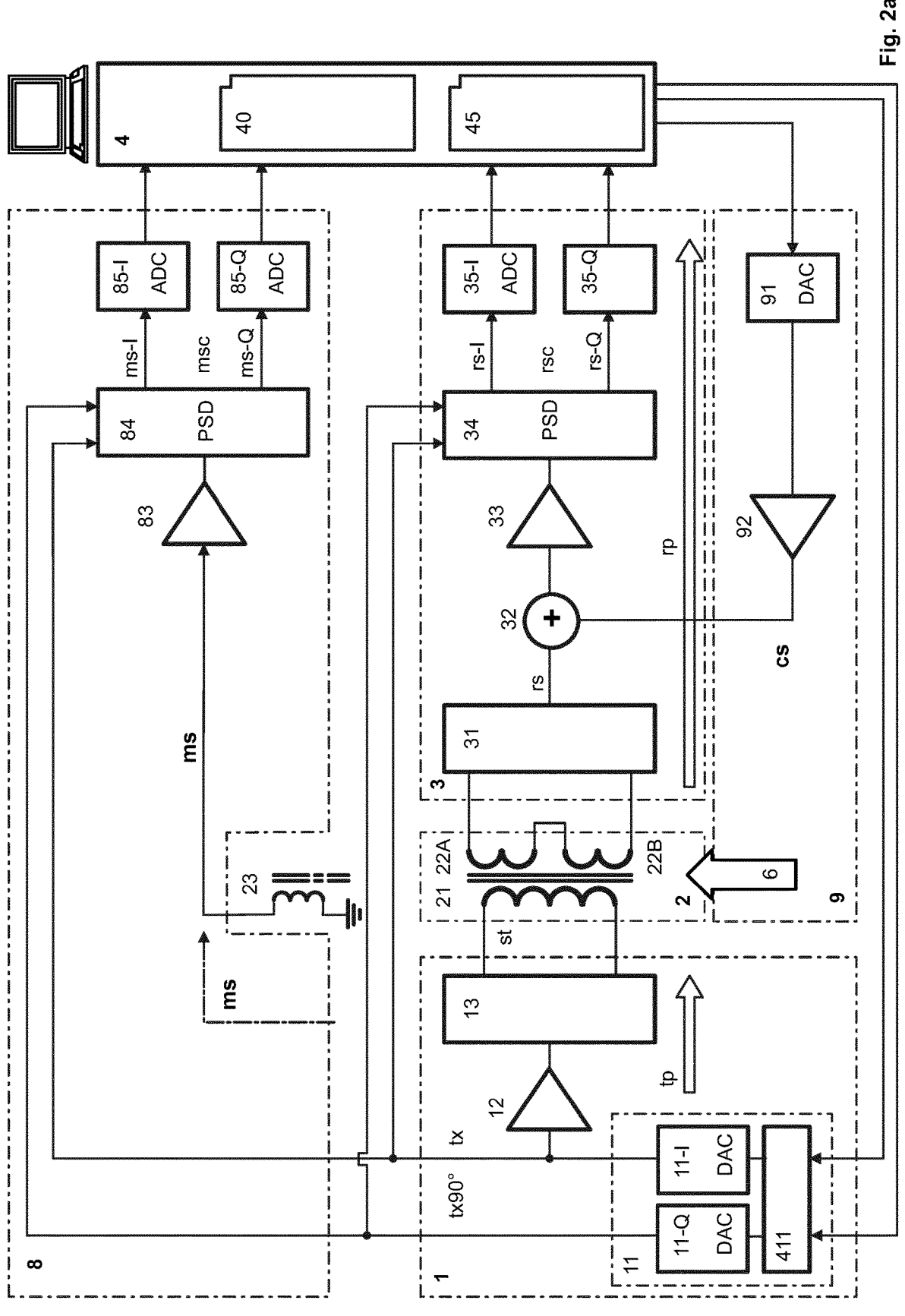
FIG. 2*a* shows the metal detector of FIG. 1 in a further preferred embodiment with a measurement coil 23, which is inductively coupled to the transmitter coil 21 and with phase sensitive detectors 34, 84 arranged in the analogue domain.

FIG. 2a shows the metal detector of FIG. 1 in a further preferred embodiment. It is shown that the frequency source 11 comprises a digital frequency source module 411, which is preferably implemented in the control unit 4 or directly in the signal processing unit 45. The digital frequency source module 411 provides digital in-phase and quadrature reference signals, which are converted in digital-to-analogue converters 11-I, 11-Q into an in-phase transmitter signal tx and a related quadrature signal tx90°.

FIG. 2a shows further that the measurement signal ms could also be picked up by a measurement coil 23, which is inductively coupled to the transmitter coil 21.

Figure 2B:
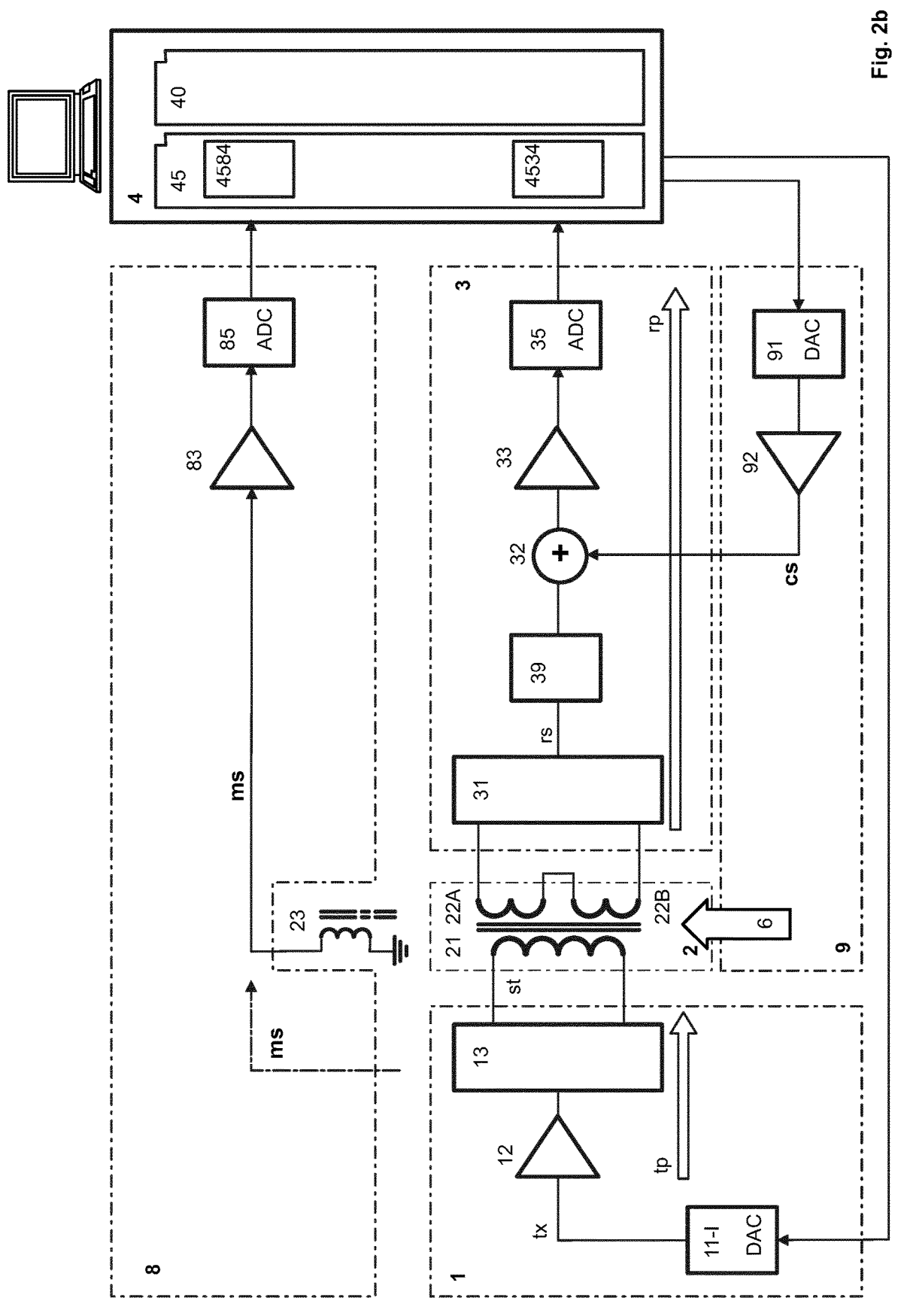
FIG. 2*b* shows the metal detector of FIG. 2*a* with the phase sensitive detectors 4534, 4584 implemented in the digital domain.

FIG. 2b shows the metal detector of FIG. 2a with phase sensitive detectors 4534, 4584 implemented in the digital domain. Hence, no reference signals are required in the analogue domain. All signal information for the demodulation of the modulated receiver signal rs and the measurement signal ms is available in the signal processing unit 45. Analogue-to-digital conversion could also be incorporated in the signal processing unit 45.

Module 39, which has been added in FIG. 2b, indicates that additional electronic modules such as amplifier units and filter units can be present in the receiver signal path rp to process the receiver signal rs.

Figure 3A:
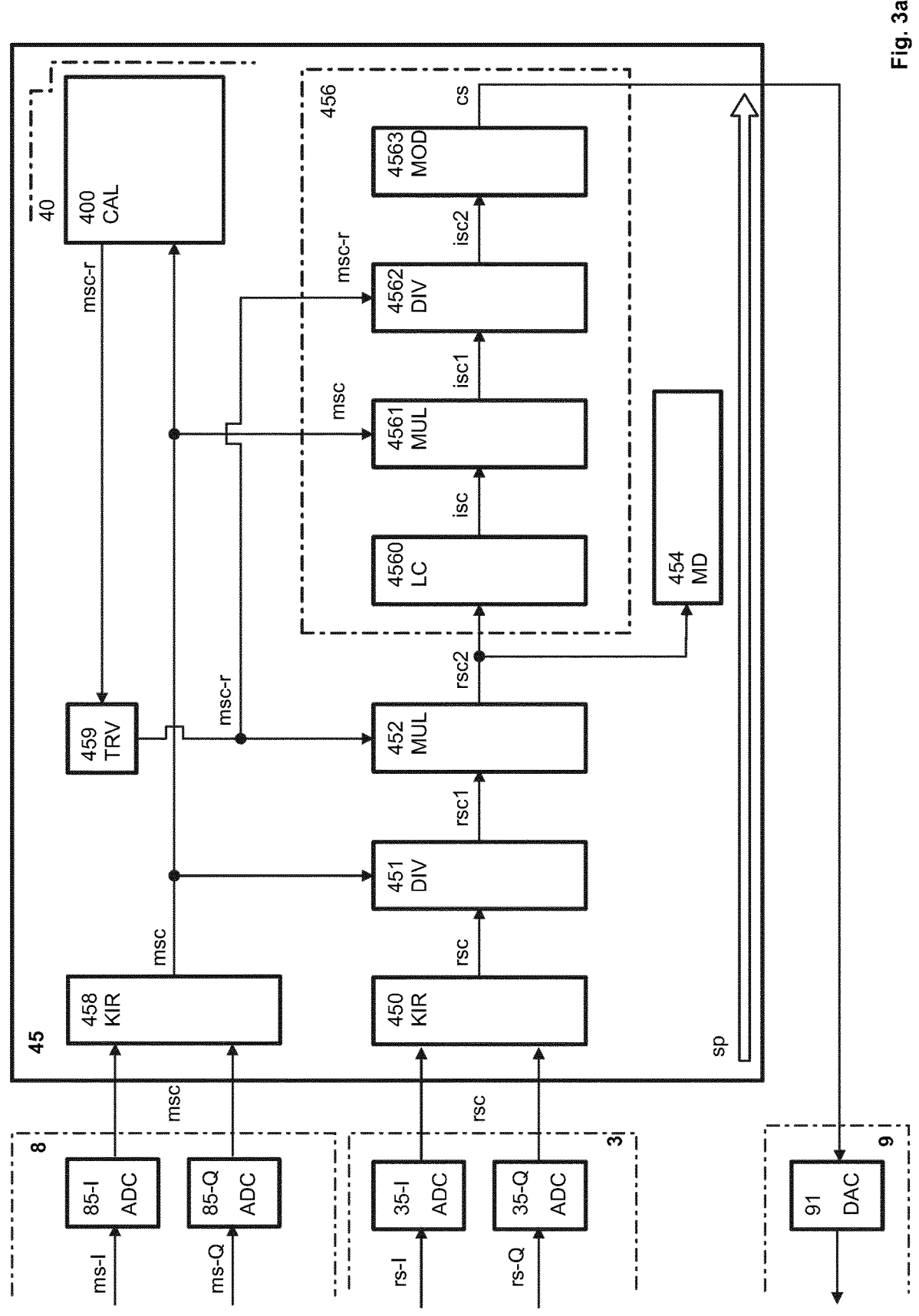
FIG. 3*a* shows the signal processing unit 45 for example of the metal detector of FIG. 1 and FIG. 2*a* in a preferred embodiment.

FIG. 3a shows the signal processing unit 45 of the metal detector of FIG. 1 and FIG. 2a in a preferred embodiment. The signal processing unit 45 is designed to process digital in-phase signals and quadrature signals along the signal processing path sp. Also in this embodiment the phase sensitive detectors could be implemented in the signal processing unit 45.

At the input side of the signal processing unit 45 the complex receiver signal rsc and the complex measurement signal msc are applied to input stages 450, 458 in which, known interferences are removed preferably by digital filters.

In a preferred embodiment, during calibration of the metal detector the complex measurement signal msc is processed to provide a complex or non-complex constant reference value msc-r that represents a constant impact of the transmitter unit 1 on the modulated receiver signal rs. The complex measurement signal msc is for example forwarded to a calibration module 400, which during a calibration process determines the constant reference value msc-r in phase and/or amplitude. The calibration module 400 is preferably part of the control program 40 or the signal processing unit 45. The constant reference value msc-r is stored in module 459 and used for normalisation of the measurement signal ms so that the normalised measurement signal ms represents no longer the absolute measurement of the transmitter channel but only the change in the measurement of the transmitter channel in the time interval between calibration has been made and the actual measurement. The reference value msc-r is typically only then recaptured when conditions of the transmitter unit 1 has significantly changed, e.g., by component changes, or changes of the signal voltage applied. As described below, the measurement signal ms can be normalised before it is applied to the first correction module or after it has been applied to the first correction module.

While the constant reference value msc-r is determined during calibration, the complex measurement signal msc is continuously observed so that all instabilities or imbalances caused by the transmitter unit 1 can continuously be corrected. According to the inventive method a part or all the instabilities, drifts and disturbances caused in the transmitter channel or transmitter signal path tp can be corrected or compensated.

For correcting continuously appearing receiver imbalances caused by transmitter instabilities the complex receiver signal rsc, which still contains signal components relating to products and contaminants conveyed through the metal detector, and the continuously obtained complex measurement signal msc are applied to a first correction module

451 in which the impact of continuously occurring instabilities of the transmitter unit 1 on the complex receiver signal rsc is removed, e.g. by a complex divide function or by a Kalman filter, each implemented in the first correction module. After this correction, the signal components relating to products and contaminants can be detected with a higher signal-to-noise ratio. Still further, false alarms that could have been caused by transmitter instabilities are avoided.

Optionally the once corrected complex receiver signal rsc1, which still contains signal components relating to products and contaminants conveyed through the metal detector, and the constant reference value msc-r are applied to a second correction module 452 in which the corrected receiver signal rsc1 is normalised preferably by the application of a complex multiply function.

An inventive metal detector may comprise only the first correction module 451 but preferably comprises the first correction module 451 and the second correction module 452 arranged in series in any order.

The complex receiver signal rsc2 at the output of the second correction module 452 is forwarded on the one hand to a signal detection module 454 and on the other hand to a compensation signal section 456, in which the compensation signal cs is created as described below. In the signal detection module 454 product components, which are still present in the complex receiver signal rsc are suppressed and signal components relating to contaminants are further processed and preferably compared with a threshold indicating and signalling the presence of contaminants if the threshold is exceeded.

As already described with reference to FIG. 1, the metal detector comprises a compensation loop. For determining an imbalance that needs correction, signal components relating to products and contaminants are removed from the complex receiver signal rsc in a loop control module 4560 that provides a complex compensation signal isc. Since the imbalance signal component contained in the modulated receiver signal rs processed in the receiving unit 3 is influenced by the drift and instabilities of the transmitter unit 1, the corrections done in the correction modules 451 and 452 are undone. The complex compensation signal isc provided by loop control module 4560 is therefore modified in at least one modification module 4561, 4562 accordingly.

To cancel the correction applied to the complex receiver signal rsc in the first correction module 451, the complex compensation signal isc and the complex measurement signal msc are applied to a first modification module 4561 provided in the compensation signal section 456, in which the complex compensation signal isc is modified by the continuously obtained complex measurement signal msc preferably by the application of a complex multiply function.

To cancel the correction applied to the once corrected complex receiver signal rsc1 in the second correction module 452, the once modified complex compensation signal isc1 provided by the first modification module 4561 and the reference value msc-r stored in module 459 are applied to a second modification module 4562 provided in the compensation signal section 456, in which the once modified complex compensation signal isc1 is modified by the reference value msc-r preferably by the application of a complex divide function, alternatively by the application of a Kalman filter.

The twice modified complex compensation signal isc2 delivered by the second modification module 4562 corresponds then to the imbalance signal component of the modulated receiver signal rs processed in the receiver unit 3.

Due to the symmetry of the imbalance signal component in the modulated receiver signal rs processed in the receiver unit 3 and the twice modified complex compensation signal isc2, cancellation of imbalances and disturbances caused by transmitter instabilities in the modulated receiver signal rs is optimised.

If the second correction module 452 is not implemented, then the corresponding second modification module 4562 is also not implemented. As mentioned, the order of arrangement of the correction modules 451, 452 and the modification modules 4561, 4562 can be changed. The functions implemented in the corresponding modules 451 and 4561 and, if present, modules 452 and 4562 are preferably inverse to one another.

The twice modified complex compensation signal isc2 is applied to a modulation module 4563, which modulates imbalance signal isc2 on a carrier frequency corresponding to the operating frequency tx. The resulting digital modulated compensation signal cs is delivered from the output of the modulation module 4563 to the digital-to-analogue converter 91, which applies the analogue modulated compensation signal cs via amplifier 92 to the compensation unit 32, such as a summation or subtraction unit, in the receiver unit 3.

Figure 3B:
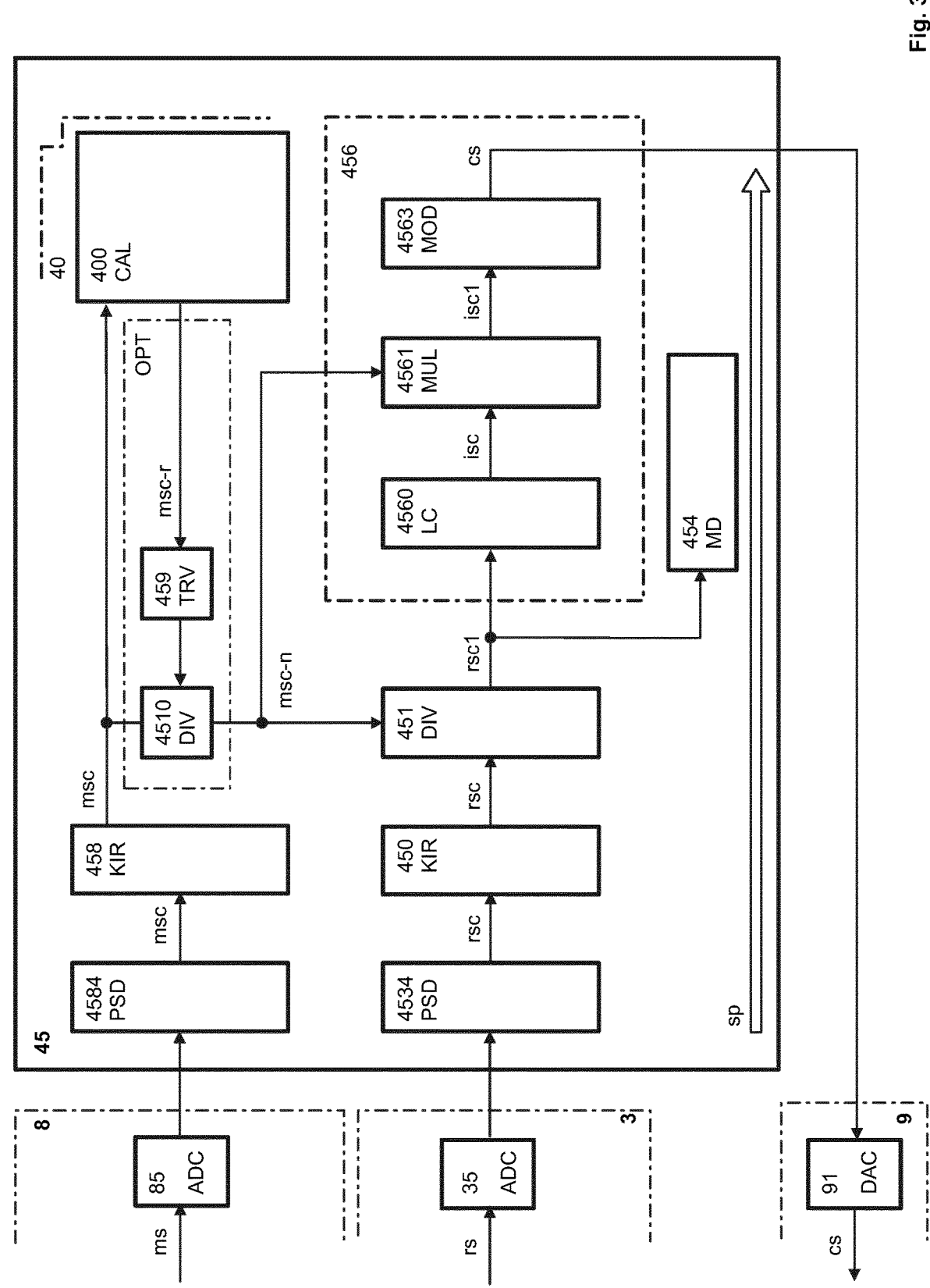
FIG. 3*b* shows the signal processing unit 45 for example of the metal detector of FIG. 2*b* in a preferred embodiment with the phase sensitive detectors 4534, 4584 arranged in the digital domain.

FIG. 3b shows the signal processing unit 45 for example of the metal detector of FIG. 2b in a preferred embodiment with the phase sensitive detectors 4534, 4584 arranged in the digital domain. Of course, the phase sensitive detectors 4534, 4584 could also be implemented in the analogue domain as shown in FIG. 1. Hence, the signal processing unit 45 in the embodiment of FIGS. 3a and 3b can be used in any embodiment of the inventive metal detector. Functional entities are moved from the analogue domain to the digital domain or from the digital domain to the analogue domain as required. The phase sensitive detectors 4534, 4584 provide a complex receiver signal rsc and a complex measurement signal msc to a corresponding interference rejection module 450, 458.

In the embodiment of the signal processing unit 45 of FIG. 3b correction of the complex receiver signal rsc and the corresponding modification of the complex compensation signal isc are done differently. The complex measurement signal msc is applied, preferably normalised, to the first correction module 451 and to the corresponding modification module 4561.

Optionally, the constant reference value msc-r is provided in module 459 and applied together with the complex measurement signal msc to a normalisation module 4510 in which the complex measurement signal msc is normalised by the constant reference value msc-r. Since only the resulting normalised measurement signal msc is applied in only one correction module 451 to the complex receiver signal rsc, only one corresponding modification module 4561 is required for undoing this correction on the compensation signal isc.

Figure 4:
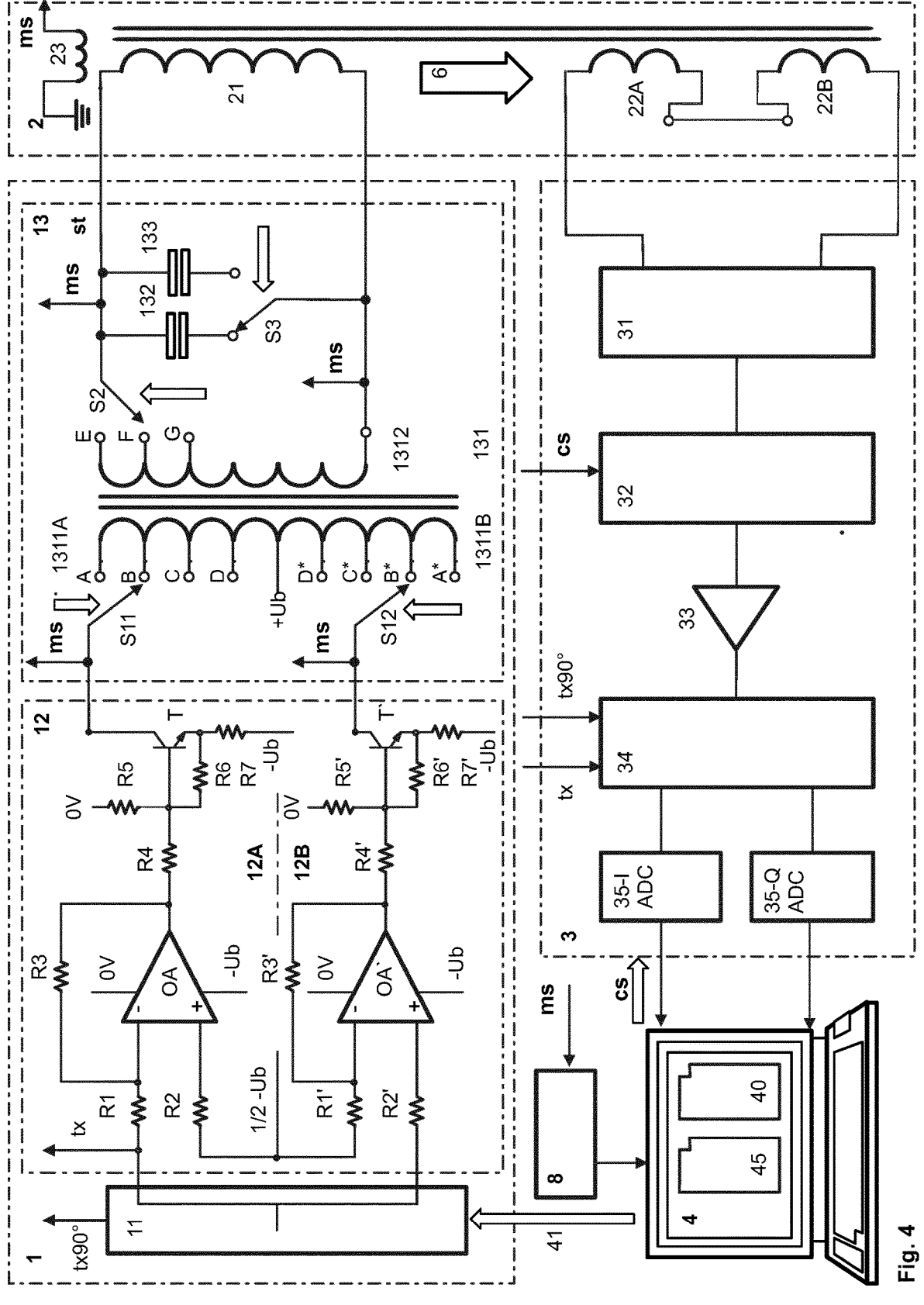
FIG. 4 shows a further example an inventive metal detector in a specific embodiment.

FIG. 4 shows a further example of a metal detector, which comprises a transmitter unit 1, a balanced coil system 2, a receiver unit 3, a transmitter measurement channel 8, and a control unit 4 with a control program 40 and a signal processing unit 45. The principle of operation of this metal detector corresponds to the principle of operation of the metal detector shown in FIG. 1. The circuitry of this metal detector without the transmitter measurement channel 8 and the related signal processing modules shown in FIG. 3 essentially corresponds to a metal detector shown in U.S.

13

Pat. No. 10,184,908B2. Hence, known and already operating metal detectors can advantageously be enhanced with the inventive solution.

The transmitter unit 1 comprises a frequency generator 11 that provides a transmitter signal tx to an upper and a lower amplifier wing 12A, 12B provided in a transmitter amplifier 12. Each amplifier wing 12A, 12B comprises a preamplifier in the embodiment of first and second operational amplifier OA, OA' respectively, which amplifies a half wave of the transmitter signal tx that is applied via resistor R1 to the inverting input of the first operational amplifier OA and via resistor R2' to the noninverting input of the second operational amplifier OA'. The noninverting input of the first operational amplifier OA and the inverting input of the second operational amplifier OA' are connected via resistor R2 and resistor R1' to one another and to a voltage potential corresponding to half of a first supply voltage –Ub. The outputs of the first and second operational amplifiers OA, OA' are connected via resistors R3, R3' to their inverting input and via resistors R4, R4' to the base of a respective first or second power transistor T, T'.

Since input transmitter signal tx is applied to the inverting input of the first operational amplifier OA the positive half wave of the transmitter signal tx is inversed and is then amplified in the first amplifier wing 12A. i.e., both, the first and the second operational amplifier OA and OA' deliver negative half waves to the base of the respective first or second power transistor T, T', which are connected via resistors R5, R5' to zero potential 0V and via resistors R6, R6' to their emitter, which is connected via resistor R7 or R7', respectively, to the first supply voltage –Ub. The collectors of the transistors T, T' are connected to a corresponding first or second switch S11, S12 provided at input of the transmitter matching unit 13. The transmitter matching unit 13 comprises a coupling transformer 131 with two primary coils 1311A, 1311B and one secondary coil 1312 and a plurality of tuning capacitors 132, 133.

The collector of the first power transistor T is connected via the first switch S11 to one of a plurality of tappings A, B, C, D of the first primary coil 1311A of the coupling transformer 131. The collector of the second power transistor T' is connected via a second switch S12 to one of a plurality of tappings A', B', C', D' of the second primary coil 1311B of the coupling transformer 131. The first and second primary coils 1311A, 1311B, which are designed identically but coiled inversely, are connected to a common tapping to a second supply voltage +Ub. The tappings A, B, C, D and A', B', C', D' are located at the same turn numbers counted from the common tapping. The first and second switches S11, S12 are controlled such that always tappings are selected that correspond to one another so that identical loads are applied to the power transistors T, T' and symmetry is maintained. Hence, in this preferred embodiment the power stages with the power transistors T, T' in the amplifier wings 12A, 12B are fully identical.

With a switch S2 the transmitter coil 21 can be connected to a suitable tapping E, F, G of the secondary coil 1312. With a further switch S3 one of the tuning capacitors 132, 133 can be connected in parallel to the transmitter coil 21. The switches S2 and S3 are selected to configure resonant circuits tuned to the selected operating frequency.

FIG. 4 further shows that the measurement signal ms is picked up at the output of the transmitter amplifier 12 at the switch S11 or S12 or switches S11 and S12 for a differential signal on the primary side of the coupling transformer 131. Alternatively, the measurement signal ms can be picked up at the secondary side of the coupling transformer 131 for example at the switches S2 and S3 for a differential signal, which connects the transmitter coil 21 to one of the tappings E, F or G. As a further alternative the measurement signal ms can be picked up at a measurement coil 23 which is inductively coupled to the transmitter coil 21. The measurement signal ms is transferred to the transmitter measurement channel 8 shown in FIG. 1 and is processed as described with reference to FIG. 1 and FIG. 3.

REFERENCE SIGNS LIST 1 transmitter unit
11 frequency source, synthesiser
11-I, 11-Q digital-to-analogue converters
12 transmitter amplifier
12A, 12B amplifier sections
13 transmitter matching unit
131 Coupling transformer
1311A, 1311B primary coils
1312 secondary coil
132, 133 tuning capacitors
2 coil system
21 transmitter coil
22A, 22B receiver coil
23 measurement coil
3 receiver unit
31 receiver matching unit
32 compensation unit
33 receiver amplifier
34 receiver phase sensitive detector/demodulator
35I, 35Q receiver analogue-to-digital converters
4 control unit
40 control program
400/CAL calibration module
411 digital frequency source module
45 signal processing unit/module
450, 458 interference rejection modules
451/DIV complex divide correction module
4510/DIV normalisation module
452/MUL complex multiply correction module
454/MD metal detection module
456 compensation signal section
4560 loop control module
4561/MUL complex divide modification module
4562/MUL complex multiply modification modules
4563/MOD modulation module
458/KIR interference rejection module
459/TRV drive reference value
6 product conveyor
8 transmitter measurement channel
83 measurement amplifier
84 measurement phase sensitive detector/demodulator
85I, 85Q measurement analogue-to-digital converters
9 compensation channel
91 digital-to-analogue converter
92 amplifier in the compensation channel
cs modulated compensation signal
isc complex compensation signal
isc1 once modified complex compensation signal
isc2 twice modified complex compensation signal
ms measurement signal
msc complex measurement signal
msc-n normalised complex measurement signal
msc-r transmitter reference value
ms-I in-phase component of the measurement signal
ms-Q quadrature component of the measurement signal
rs modulated receiver signal rsc complex receiver signal
rs-I in-phase component of the complex receiver signal
rs-Q quadrature component of the complex receiver signal
rsc1 once corrected complex receiver signal
rsc2 twice corrected complex receiver signal
tx; tx90° transmitter signal, quadrature signal
OPT optional module

The invention claimed is:

1. A method for operating a metal detector comprising a balanced coil system with a transmitter coil connected to a transmitter unit and with a first and a second receiver coil connected to an input of a receiver unit, which is connected to a signal processing unit, said method comprising:

providing a transmitter signal with at least one fixed or selectable operating frequency and a related quadrature signal at a transmitter signal path of said transmitter unit, where said transmitter signal is applied to an input of a transmitter amplifier that forwards the amplified transmitter signal directly or via a transmitter matching unit to the transmitter coil;

receiving a modulated receiver signal from the balanced coil system in at least one receiver signal path of the receiver unit;

applying, directly or via a receiver matching unit, the modulated receiver signal to a receiver amplifier to generate an amplified modulated receiver signal;

forwarding, by way of the receiver amplifier, the amplified modulated receiver signal directly or indirectly to a receiver phase sensitive detector;

comparing, by way of the receiver phase sensitive detector, the amplified modulated receiver signal with reference signals, which correspond to the transmitter signal and the quadrature signal, to produce a demodulated complex receiver signal with in-phase receiver signal components and quadrature receiver signal components;

processing, in the signal processing unit, said in-phase receiver signal components and said quadrature receiver signal components, wherein the signal processing unit comprises at least one signal processing path, in which signal components of the complex receiver signal that relate to goods or noise are suppressed and in which signal components originating from metal contaminants are further processed;

receiving, by way of at least one transmitter measurement channel, a measurement signal from the transmitter signal path, said at least one transmitter measurement channel comprising a measurement amplifier, which amplifies and forwards the measurement signal directly or indirectly to a measurement phase sensitive detector;

comparing, by way of the measurement phase sensitive detector, the measurement signal with the reference signals, where said reference signals correspond to the transmitter signal and the quadrature signal, to produce a complex measurement signal with in-phase measurement signal components and quadrature measurement components; and applying, by way of a first correction module said complex measurement signal and complex receiver signal, to a first correction module in which signal components caused by instabilities of the transmitter unit are removed from the complex receiver signal.

2. The method of claim 1 further comprising:

providing a control loop for removing imbalance signal components contained in the modulated receiver signal by removing signal components relating to products and contaminants from the complex receiver signal in a loop control module in order to obtain a complex compensation signal;

cancelling the correction applied to the complex receiver signal in the first correction module by applying the complex compensation signal and the complex measurement signal to a first modification module that provides a modified compensation signal;

modulating the modified compensation signal on a carrier frequency, which carrier frequency corresponds to the operating frequency, in a modulation module for providing a modulated compensation signal;

converting the modulated compensation signal in a digital-to-analogue converter to a modulated analogue compensation signal; and applying the modulated analogue compensation signal to a compensation unit provided in the receiver signal path for compensating the imbalance signal component contained in the modulated receiver signal.

3. The method of claim 1 further comprising:

processing the complex measurement signal during calibration of the metal detector in a calibration module to obtain a complex or non-complex constant reference value that represents a constant impact of the transmitter unit on the modulated receiver signal and is used for directly or indirectly normalizing the complex measurement signal.

4. The method of claim 3, further comprising:

applying the constant reference value and the complex receiver signal to a second correction module for providing a normalized complex receiver signal; and cancelling the correction applied to the complex receiver signal in the second correction module by applying the complex compensation signal and the constant reference value to a second modification module provided in the control loop.

5. The method of claim 3, further comprising:

applying the constant reference value and the complex measurement signal to a normalization module, which provides a normalized measurement signal to the first correction module; and cancelling the correction applied to the complex receiver signal in the first correction module by applying the complex compensation signal and the normalized measurement signal to the first modification module provided in the control loop.

6. The method of claim 1, further comprising:

picking up the measurement signal at the output of the transmitter amplifier; or transforming the transmitter signal in the transmitter matching unit by way of a coupling transformer having at least one primary coil and at least one secondary coil and picking up the measurement signal at the at least one primary coil or at the at least one secondary coil; or coupling a measurement coil to the transmitter coil and picking up the measurement signal at the measurement coil.

7. The method for of claim 1, further comprising:

providing for each operating frequency a dedicated receiver signal path and a dedicated signal processing path and a dedicated transmitter measurement channel.

8. A metal detector configured to be operated in accordance with the method of claim 1.

9. The metal detector of claim 8, further comprising:

a balanced coil system with a transmitter coil that is connected to a transmitter unit and with a first and a second receiver coil that are connected to an input of a receiver unit, which is connected to a signal processing unit, and comprising a frequency source that provides a transmitter signal with at least one fixed or selectable operating frequency and a related quadrature signal;

wherein said transmitter unit comprises at least one transmitter signal path with a transmitter amplifier which, directly or via a transmitter matching unit, is connected to the transmitter coil;

wherein said receiver unit comprises at least one receiver signal path, in which the receiver coils of the balanced coil system are connected directly or via a receiver matching unit to an input of a receiver amplifier, from which the amplified modulated receiver signal is applied directly or indirectly to a receiver phase sensitive detector;

wherein said receiver phase sensitive detector is designed to compare the modulated receiver signal with reference signals corresponding to the transmitter signal and the quadrature signal to produce a demodulated complex receiver signal with in-phase receiver signal components and quadrature receiver signal components;

wherein said signal processing unit which comprises at least one signal processing path, in which the signal components of the complex receiver signal that relate to goods or noise are suppressed and in which signal components originating from metal contaminants are further processed;

at least one transmitter measurement channel, which comprises a measurement amplifier with an input that is connected to the transmitter signal path to receive a measurement signal and with an output that is connected directly or indirectly to a measurement phase sensitive detector;

where said measurement phase sensitive detector is designed to compare the measurement signal with the reference signals corresponding to the transmitter signal and the quadrature signal to produce a demodulated complex measurement signal with in-phase measurement signal components and quadrature measurement components;

wherein said measurement phase sensitive detector is connected to a first correction module implemented in the signal processing path in which signal components from the complex receiver signal that are caused by instabilities of the transmitter unit are removable.

10. The metal detector of claim 9, wherein:

the outputs of the receiver phase sensitive detector and the outputs of the measurement phase sensitive detector are connected via analogue-to-digital converters to the signal processing unit or wherein the receiver phase sensitive detector and the measurement phase sensitive detector are implemented in the software domain of the signal processing unit.

11. The metal detector of claim 8, wherein:

the measurement signal is transferable from the output of the transmitter amplifier to the input of the measurement amplifier; or the transmitter matching unit comprises a coupling transformer having at least one primary coil and at least one secondary coil and wherein the measurement signal is transferable from the at least one primary coil or at the at least one secondary coil to the input of the measurement amplifier; or a coupling a measurement coil is inductively coupled to the transmitter coil and connected to the input of the measurement amplifier for providing the measurement signal.

12. The metal detector according to claim 8:

wherein the signal processing unit comprises a control loop for removing imbalance signal components contained in the modulated receiver signal; and further comprising:

a loop control module, which provides a complex compensation signal, that does not contain signal components relating to products and contaminants;

a first modification module, to which the complex compensation signal and the complex measurement signal are applied for providing a modified compensation signal in which the correction applied to the complex receiver signal in the first correction module is cancelled;

a modulation module which provides a modulated compensation signal;

a digital-to-analogue converter which converts the digital modulated compensation signal to an analogue modulated compensation signal; and a compensation unit provided in the receiver signal path, in which the modulated analogue compensation signal is applicable to the modulated receiver signal in order to remove imbalances.

13. The metal detector of claim 8, wherein:

a calibration module is provided, which is designed for processing the complex measurement signal during calibration of the metal detector to obtain a complex or non-complex constant reference value that represents a constant impact of the transmitter unit on the modulated receiver signal.

14. The metal detector of claim 13, further comprising:

a second correction module to which the constant reference value and the complex receiver signal are applicable and which second correction module is designed for providing a normalized complex receiver signal; and a second modification module is provided in the control loop to which the complex compensation signal and the constant reference value are applicable and in which the correction applied to the complex receiver signal in the second correction module is cancelled.

15. The metal detector according to claim 13, further comprising:

a normalization module, to which the constant reference value and the complex measurement signal are applicable and which normalization module provides a normalized measurement signal to the first correction module, wherein the complex compensation signal and the normalized measurement signal are applicable to the first modification module, in which the correction applied to the complex receiver signal in the first correction module is cancelled.

* * * * *